(12) United States Patent
Freudelsperger

(10) Patent No.: US 8,739,958 B2
(45) Date of Patent: Jun. 3, 2014

(54) SHIPPING BAY OR SHELF IN A COMMISSIONING UNIT

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 588 days.

(21) Appl. No.: 13/058,789

(22) PCT Filed: Jul. 17, 2009

(86) PCT No.: PCT/EP2009/005227
§ 371 (c)(1),
(2), (4) Date: Feb. 11, 2011

(87) PCT Pub. No.: WO2010/017871
PCT Pub. Date: Feb. 18, 2010

(65) Prior Publication Data
US 2011/0142582 A1  Jun. 16, 2011

(30) Foreign Application Priority Data

Aug. 14, 2008 (DE) .......................... 10 2008 037 659

(51) Int. Cl.
*B65G 1/137* (2006.01)
*B65G 1/08* (2006.01)

(52) U.S. Cl.
USPC ........................ 198/347.1; 414/267; 414/276

(58) Field of Classification Search
None
See application file for complete search history.

(56) References Cited

U.S. PATENT DOCUMENTS

| 3,687,312 | A | * | 8/1972 | Weir | 414/267 |
| 3,869,028 | A | | 3/1975 | Sawada et al. | |
| 5,141,118 | A | * | 8/1992 | Gay | 211/151 |
| 5,478,183 | A | * | 12/1995 | Savigny | 414/276 |
| 5,797,557 | A | * | 8/1998 | Wang et al. | 242/473.6 |
| 6,012,041 | A | * | 1/2000 | Brewer et al. | 705/28 |
| 2008/0269960 | A1 | | 10/2008 | Kostmann et al. | |

FOREIGN PATENT DOCUMENTS

AT           403 156 B      11/1997
WO     WO 2005118436 A1    6/2005

* cited by examiner

*Primary Examiner* — Kavel Singh
(74) *Attorney, Agent, or Firm* — McGlew and Tuttle, P.C.

(57) ABSTRACT

A shipping bay arrangement (1), preferably in an order-picking installation, for accepting and delivering containers (2), with ramps (3) which are arranged next to one another and one above the other, the outlets (A) of which can be reached manually by an operator and on the filling side of which, feeding and filling devices are arranged, wherein the ramps arranged next to one another respectively form a rack level (I, II, III, IV, V) of the shipping rack. A container feeding section (4) leads to a lift (5) of the shipping rack. The lift (5) transports a fed container (2) to a selected rack level, wherein a dedicated rail-guided level conveyor device (6) is provided at each rack level, and receives the fed container (2). The level conveyor device (6) can be made to move transversely in relation to the inlets (E) of the ramps (3) for transporting the fed container (2) to a selected ramp, and for filling the selected ramp with the fed container. A buffer section (7) may be provided at each rack level, and downstream of the lift. At the exit of the buffer section, the level serving device (6) of each rack level can be positioned for taking over a fed container.

19 Claims, 6 Drawing Sheets

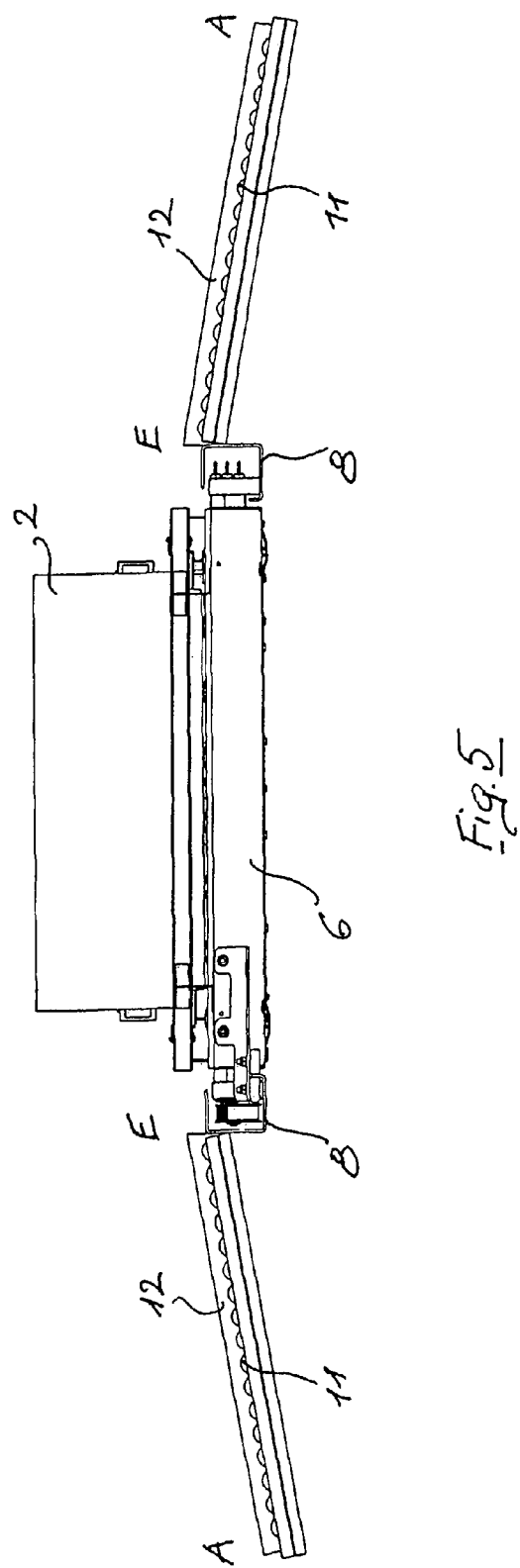

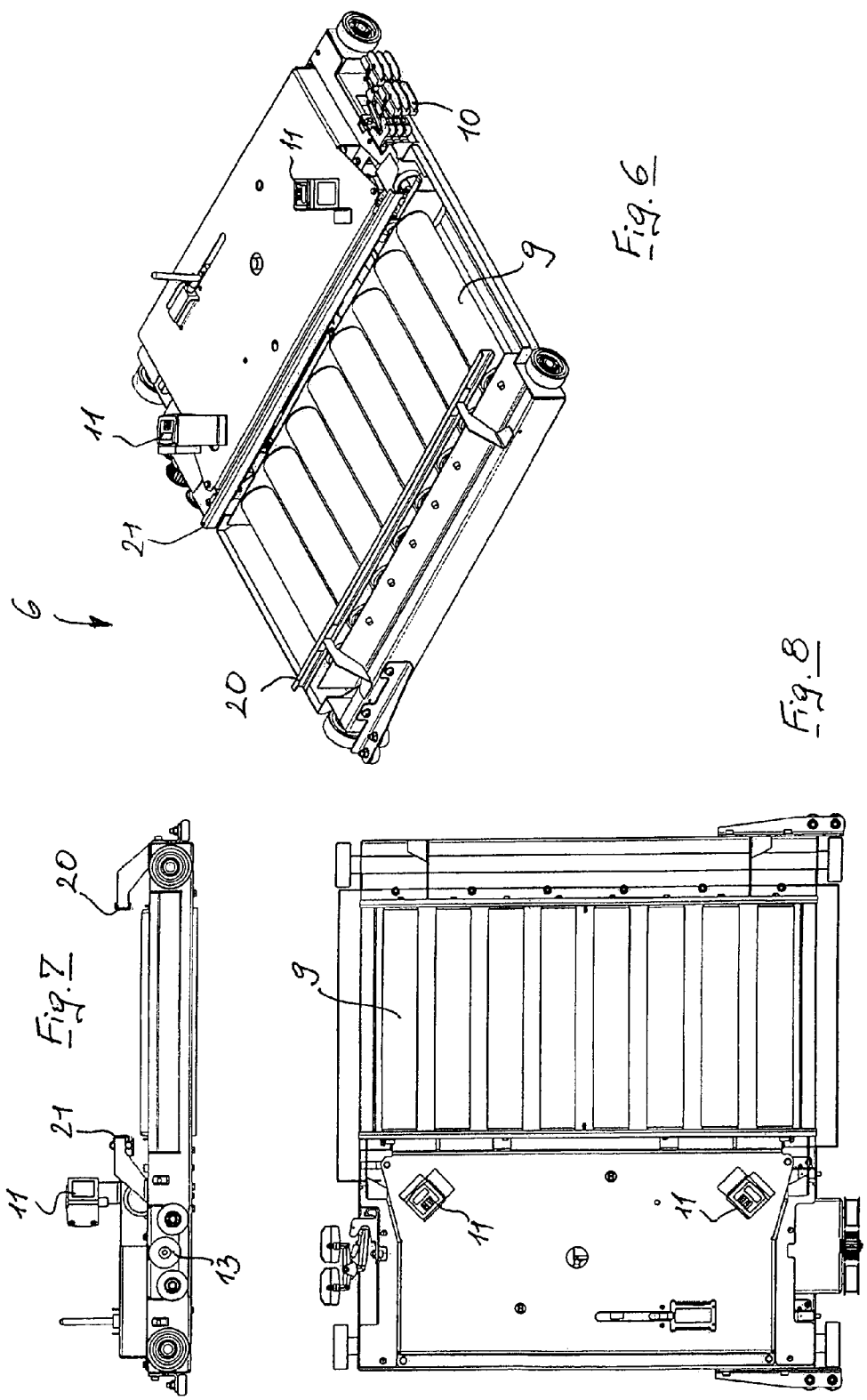

SHIPPING BAY OR SHELF IN A COMMISSIONING UNIT

CROSS REFERENCE TO RELATED APPLICATIONS

This application is a United States National Phase application of International Application PCT/EP2009/005227 and claims the benefit of priority under 35 U.S.C. §119 of German patent application 10 2008 037 659.0 filed Aug. 14, 2008, the entire contents of which are incorporated herein by reference.

FIELD OF THE INVENTION

The present invention pertains to a shipping bay arrangement preferably in a commissioning unit for receiving and releasing containers, with ramps, which are arranged next to each other and one on top of each other, and whose outlets can be reached by a human operator by hand and on the filling site of which feeding and filling means are arranged, wherein ramps arranged next to each other form a bay level each of the shipping bay.

BACKGROUND OF THE INVENTION

An above-mentioned shipping bay, in which unambiguous, automatic assignment of the containers released, which contain the merchandise to be commissioned, to individual customers is possible, is known from AT 403 156 B. A stationary driven roller conveyor is provided in each bay level as a container conveying means on the filling side, and a pivoting unit, which is assigned to a plurality of ramps arranged next to each other and which can be pivoted upward to release in the upwardly pivoted state containers onto a selected sloped ramp of a selected bay level based on the container's own weight, meshes between the rollers of said roller conveyor. A switch mechanism in the form of a pivotable slope conveyor, which can convey containers from a stationary feed section into any desired bay level onto the container roller conveyor located there, is located in front of the container conveying means arranged one on top of another.

SUMMARY OF THE INVENTION

Based on the above-mentioned state of the art, the object of the present invention is to improve the feeding and filling side of the shipping bay such that reliable effective sorting operation of a shipping bay is possible with a small design effort.

The object is accomplished by a shipping bay having the features according to the present invention. The essence of the present invention is that a container feed section is connected to an elevator of the shipping bay, which releases a fed container into a selected bay level, and a separate track-guided level control or conveyor unit, which is displaceable at right angles to the inlets of the ramps, is provided in each bay level for transporting the fed container to a selected ramp and for filling the selected ramp with the fed container.

A buffer section is arranged downstream of the elevator and is preferably provided in each bay level. Each buffer section has an outlet at which the level control or conveyor unit of a respective bay level can be positioned for taking over a fed container.

The level control units are guided especially in horizontal braces of the shipping bay, which are designed as rails, and the shipping bay is designed especially advantageously as a double bay, and the level control units can be horizontally displaced in a central bay aisle of the double bay and can be positioned at the outlets of the buffer section and at the inlets of opposite ramps.

The level control unit has a load pickup or carrying means in the form of drivable rollers, whose axes extend in the direction of travel of the level control unit and at right angles to the ramps.

The load pickup means may also be provided in the form of a conveyor belt or in the form of a plurality of round or toothed belts.

Thus, the prior-art, complicated stationary roller conveying mechanism in every bay level is replaced by the present invention by lightweight, displaceable level control units of a simple design. In addition, vertical transportation does not take place via a pivotable slope conveyor, as according to the above-mentioned state of the art, but via a stationary elevator of a simple design, preferably with an adjusting platform for only one container. It was found that the use of an elevator is advantageous even in case of shipping bays of this class with a small overall height, which are not high bays, and can be reached by a human operator by hand at the outlet. The possibility of expansion is advantageous as well. The existing level control units can equally reach and operate the additional bay modules. The ramps require no control instruments such as sensors or reflectors for checking the filling level, because the control instruments are displaceable and are arranged on level control units that are present anyway.

In summary, the following advantages arise compared with the state of the art described in the introduction:

The area of the level control units is walkable in a simple manner even in case of arrangement of the ramps on both sides.

Simplicity of design/cost savings.

The number of ramps, whose design is not complicated, hardly affects the price, because no additional ejectors are needed. As a result, it is also possible to embody many short ramps. These many short ramps are advantageous for sorting according to customer orders and are often necessary. They permit finer sorting criteria.

Shorter ramps can be sloped more steeply, without the pressure on the frontmost container becoming too high. The operational reliability of the shipping bay increases as a result, because no containers will stop at half of the section.

The number of components is much smaller. The maintenance effort is also lower as a result.

Checking to determine whether a ramp is full does not need to be arranged per ramp any longer, but it is carried along centrally at the level control unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a view of the bay plane according to FIG. 4 shown schematically from the front with a container omitted;

FIG. 6 is the level control unit according to FIG. 4 in a perspective view;

FIG. 7 is the level control unit according to FIG. 4 in a side view; and

FIG. 8 is the level control unit according to FIG. 4 in a top view.

DESCRIPTION OF THE PREFERRED EMBODIMENTS

Figure 1:
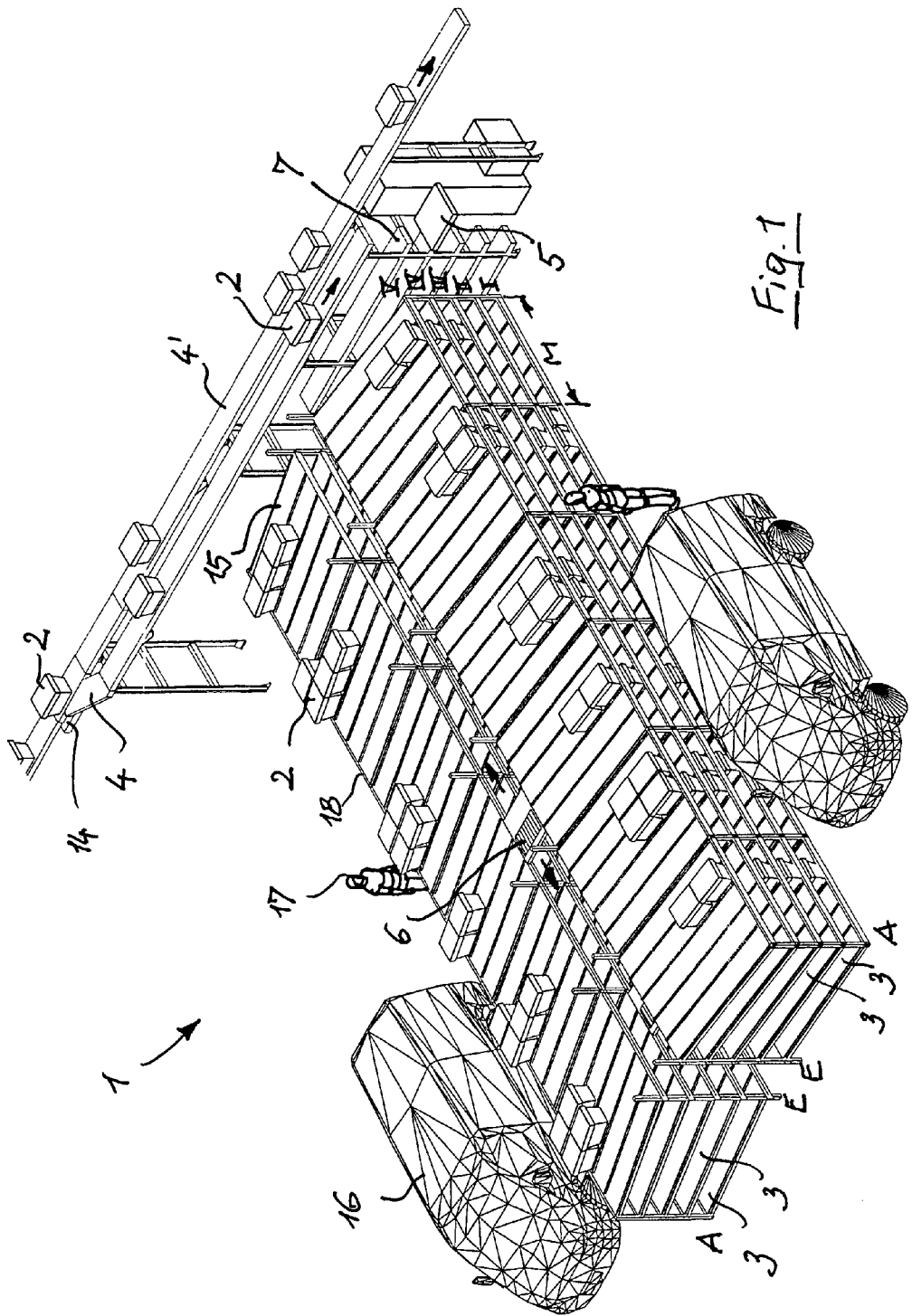
FIG. 1 is a shipping bay according to the present invention in a schematic perspective view from the rear.
Figure 2:
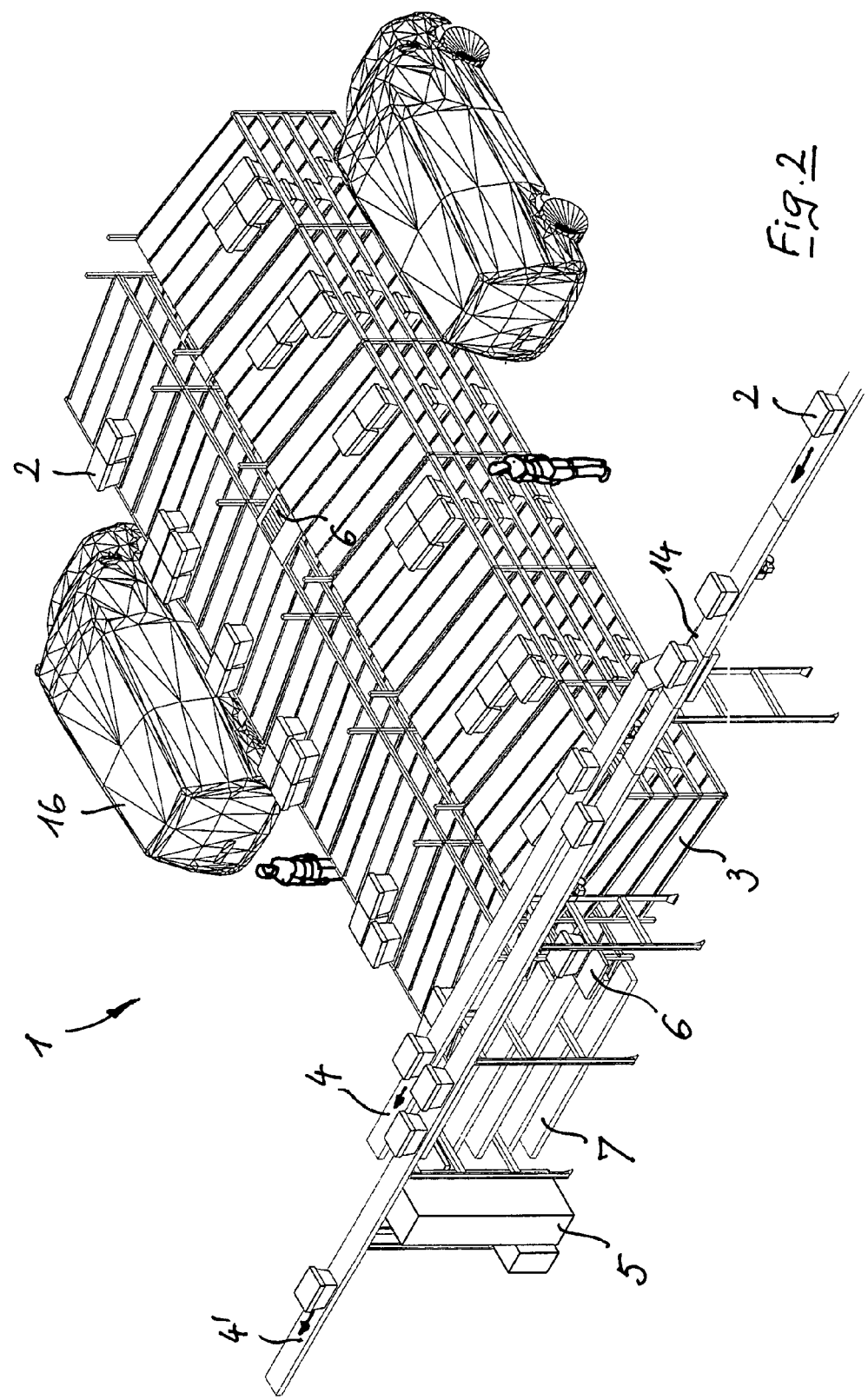
FIG. 2 is the shipping bay according to FIG. 1 in a schematic perspective view from the front, as seen from the container feed section.
Figure 3:
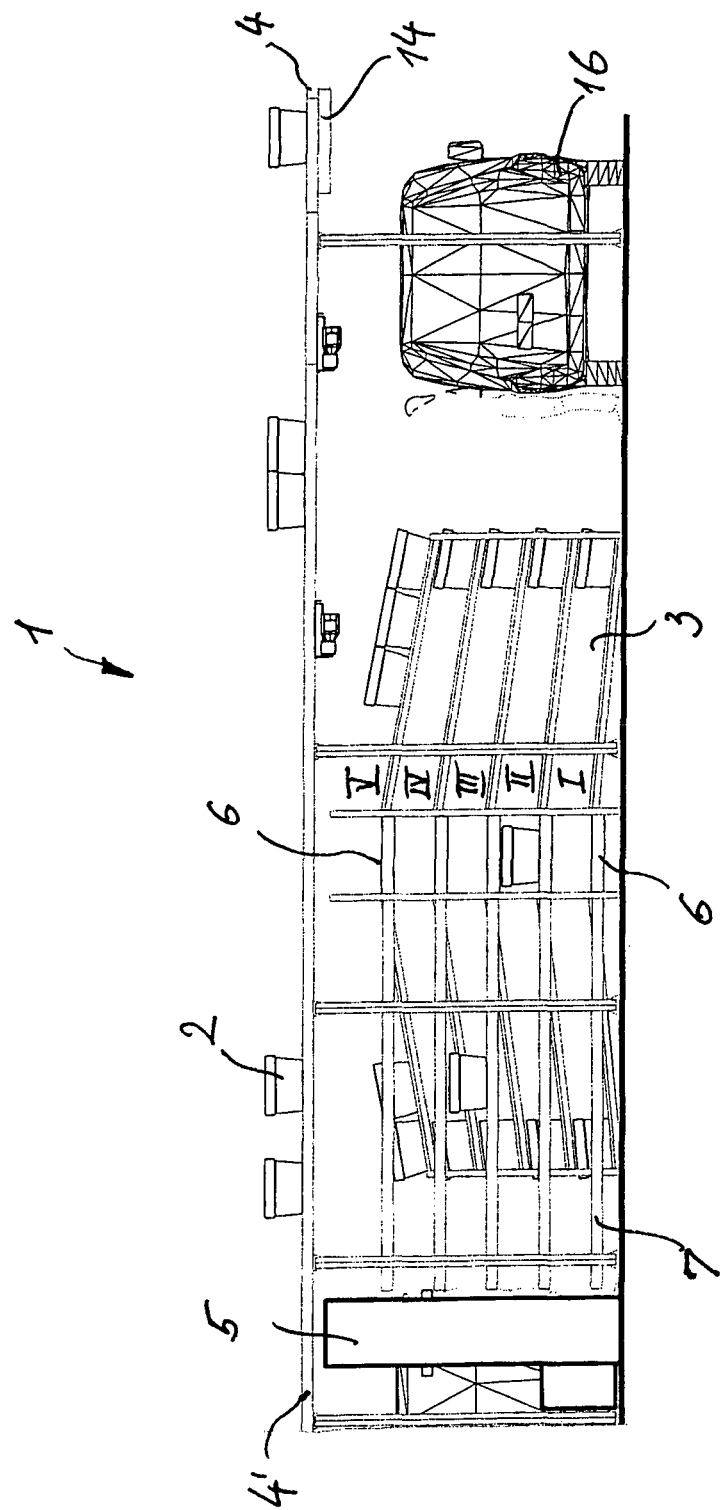
FIG. 3 is the shipping bay according to FIGS. 1 and 2 in a schematic side view from the front.
Figure 4:
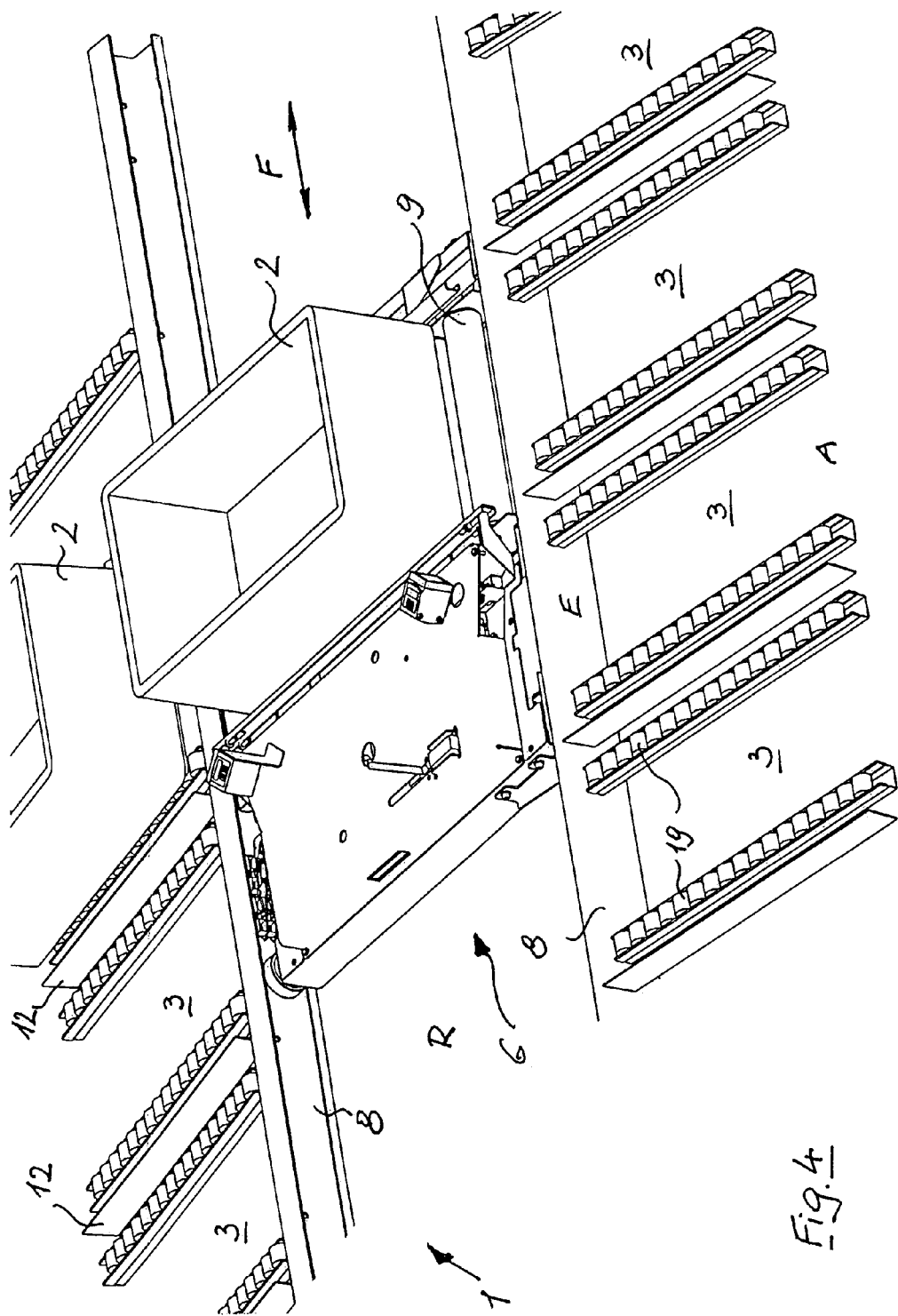
FIG. 4 is a view of a bay plane in a larger perspective detail with a level control unit.

Referring to the drawings in particular, FIGS. 1, 2 and 3 schematically show a shipping bay 1 of a commissioning unit for receiving and releasing containers 2.

The shipping bay 1 comprises ramps 3, arranged next to each other and one on top of another, whose outlets A can be reached by a human operator by hand, while the operator is standing on the floor of the shipping bay 1. On the filling side of the ramps 3 feeding and filling means are arranged. The ramps 3 are arranged next to each other to form bay levels I, II, III, IV, V in each of the shipping bays.

The shipping bay 1 has a container feed section 4, which is connected to a stationary elevator 5 of the shipping bay. The elevator 5 releases a fed container 2 into a selected bay plane I, II, III, IV, V.

The container feed section 4 has a recognition means in the area of a discharge station 14 for recognizing a fed container 2 and for transmitting the data of the container to a central computer, which brings about a fully automatic operation of feeding the containers along with sorting in the ramps 3.

The container feed section 4 according to FIGS. 1, 2 and 3 has at the discharge station 14 a connection section 4' for an adjacent shipping bay of the same type, preferably in a parallel arrangement.

The shipping bay 1 is composed of a plurality of bay modules M, which are located one after another, and are in a direction of travel F of the level control or conveyor units 6, which will be described below.

Both the horizontal container feed section 4 to the elevator 5 and the horizontal connection section 4', which is parallel hereto, including the discharge station 14, are located in a warehouse in an overhead arrangement. The overhead arrangement permits passages into the warehouse.

A separate, track-guided level control or conveyor unit 6 according to FIGS. 3 through 7, which is displaceable at right angles to the inlets E of the ramps 3, is located in each bay level for transporting a fed container 2 to a selected ramp 3 and for filling the selected ramp 3 with the fed container 2.

Furthermore, a buffer section 7 is provided in each bay level I, II, III, IV, V. Each buffer section is arranged downstream of the elevator 5. At the outlet of each buffer section, the level control unit 6 of a respective bay level can be positioned for taking over a fed container 2. The buffer sections 7 are horizontal roller conveyors arranged one on top of another with drivable individual rollers in the form of an accumulating roller conveyor and extend in the top view in parallel to the ramps 3.

Sloped reject ramps 15 for rejects, are provided, in the manner of the actual ramps 3, in the area of the buffer sections 7 for receiving unidentifiable and consequently unsortable containers, which can be processed further separately.

The level control units 6 are guided in horizontal braces of the shipping bay 1, which braces are designed as rails 8.

The shipping bay 1 according to FIGS. 1, 2 and 3 is designed as a double bay, and the level control units 6 are horizontally displaceable in a central bay aisle R of the double bay and can be positioned at the outlets of the buffer section and at the inlets E of opposite ramps.

The level control unit 6 according to FIGS. 4, 5, 6, 7 and 8 has a load pickup means in the form of drivable rollers 9, whose axes extend in the direction of travel F of the level control unit 6 and at right angles to the ramps 3.

The load pickup means has, in the area of the axial ends of the rollers 9, a stationary lateral railing 20, 21 at right angles to the direction of travel F, the distance between the two lateral railings 20, 21 being able to be selectively set and preferably correspond to the width of a container 2, and at least one of the two railings 20 is adjustable.

Such a level control unit 6 may be positioned at the inlets E of ramps 3 having different widths, the distance between the two railings 20, 21 being set to the width of the ramp 3 to be activated or serviced.

The level control unit 6 has an integrated electric drive 13, which is connected to a stationary conductor rail preferably via sliding contacts 10.

The electric drive 13 comprises a shaft encoder, with which the distance traveled by the level control unit 6 can be measured. The level control unit thus knows its position and can be positioned in front of a desired ramp 3.

In particular, the level control unit 6 has two sensors 11 for recognizing the state of filling of two opposite ramps 3 of the double bay.

The ramps 3 themselves are short, relatively steeply sloped ramps 3 with two lateral roller strips 19 with an outlet-side stop, wherein adjacent ramps of one bay level are separated from each other by separating webs 12.

A container routing will be described below.

A container 2 filled with commissioned merchandise is coming from the commissioning area of a warehouse into the shipping area of the commissioning unit according to FIG. 1, comprising a plurality of shipping bays 1 in a parallel arrangement and now moves on a driven container feed section 4 in an overhead arrangement to a discharge station 14. Only one block of the plurality of shipping bays 1 is shown.

Container 2 is read here in the recognition means of the discharge station 14. The system control recognizes whether the container 2 must be discharged to the block of a double bay shown in FIGS. 1, 2 and 3 and possibly reports it to subordinate control means in front of the elevator 5, in the buffer section 7 and in the level control unit 6. The level I, II, III, IV or V and the ramp 3 on which the container 2 shall be released is thus known.

Container 2 is discharged onto the last part of the container feed section 4 in front of the elevator 5.

Container 2 is read again in front of the elevator 5. Elevator 5 brings the container 2 onto the buffer section 7 of the plane or bay level indicated.

Container 2 is read once again before transfer to the level control unit 6.

The level control unit 6 is positioned in front of the outlet of the buffer section 7 and activates the load pickup means of the level control unit in the form of drivable rollers 9. The load pickup means is a piece of roller conveyor mechanism, which is mounted at the level control unit.

The level control unit 6 picks up the container 2, moves along the bay level in the direction of travel F and is subsequently positioned such that the container can be released onto the desired ramp.

Container 2 is subsequently moved into the desired ramp 3 by switching on the rollers 9 of the load pickup means. The removed container 2 reaches a stop 18 at the outlet A of ramp 3 under its own weight with ramp 3 being empty. The container 2 is transferred there by a human operator 17 into a vehicle 16 standing ready for correct routing.

The sorting of the shipment is based on the fact that order containers are assigned to the shipping ramps separately according to order. Only the containers of one order, or of one customer, are introduced per ramp. The ramps of one run are in a contiguous area of the shipping bay. The ramps are assigned to an order such that the driver can remove the containers and load them directly into the vehicle in the correct sequence for the run. Sorting of the containers by the driver is eliminated as a result. The time spent by the vehicle in the shipping area decreases. The area per vehicle can also be made smaller, because no containers need to be placed on the floor behind the vehicle and sorted any more.

Thus, the present invention pertains to a shipping sorting bay with the same logistic goal as according to the state of the art according to AT 403 156 B mentioned in the introduction.

The level control unit 6 has rollers 9 as load pickup means. The rollers 9 are driven and can pick up and release a container 2 at right angles to the direction of travel F.

The level control unit 6 travels on running rails 8. The level control unit is driven in the embodiment variant described with a so-called omega drive according to FIG. 7 along a fixed toothed belt, said toothed belt running as in an omega around the drive roller. The motor of the level control unit has a shaft encoder, with which the distance traveled can be measured. The level control unit thus knows its position and can be positioned in front of the desired ramp. The drive may, in principle, also be designed as a frictionally engaged drive with wheels. The level control unit is held by guide rollers in a fixed position in relation to the shipping bay, because the rails 8 are part of the shipping bay.

By switching on the rollers, the level control unit can pick up containers 2 from the conveying means and release same into the ramps 3. A ramp is formed from two or more roller strips 19 and limiting separating webs 12.

The level control unit 6 is equipped with sensors 11, which makes it possible to recognize whether a ramp 3 can still take up a container 2 or the ramp is full. This can be performed with a sensor 11, which is able to measure the distance from the next obstacle (e.g., optically or with ultrasound). However, a reflector may also be arranged per ramp, and a photoelectric cell checks whether the path to the reflector is clear. If the photoelectric cell sees the reflector, the channel is clear.

Sensor 11 may also be used to check whether a container 2 was released correctly into the ramp 3.

In case of containers 2 of different widths and ramps adapted to the width, the container 2 must be aligned at a defined edge. This is the front railing 20 of the level control unit 6 in this case. The alignment at the railing can be brought about by the container being taken over already in the aligned position from the conveying mechanism in another embodiment variant. However, provisions are primarily made for designing the railing 20 as a displaceable railing in order to obtain the desired alignment. Simultaneous measurement of the product width is also possible with the displaceable railing. Deviations between the ramp width and the product width could consequently be recognized.

The elevator may be equipped with different elevator platforms. The platform has single depth in the simplest variant, i.e., only one container 2 can be carried per trip. It is possible, in principle, to also build platforms with double or multiple depths in order to make it possible to transport a plurality of containers per trip. Depending on the arrangement of the conveyor mechanism, the elevator may operate as a so-called C conveyor or S conveyor. "C" means that the container describes a "C," i.e., the container enters in one direction and leaves in the other direction. In an "S," the container moves away from the elevator in the same direction.

While specific embodiments of the invention have been described in detail to illustrate the application of the principles of the invention, it will be understood that the invention may be embodied otherwise without departing from such principles.

The invention claimed is:

1. A shipping bay arrangement, with a small overall height, and can be reached by a human operator by hand at an outlet, for receiving and releasing a plurality of containers, the shipping bay arrangement comprising:

a plurality of ramps arranged next to each other and one on top of another, wherein said ramps being arranged next to each other form one of a plurality of bay levels of a shipping bay, said ramps being sloped and said ramps including lateral roller strips, wherein separating webs are arranged between adjacent said ramps of one bay level, one of said ramps being reserved for rejected containers, each of said ramps having an inlet and an outlet, said outlets being arranged to be reached by a human operator by hand from the ground without any means;

a separate, rail-guided level conveyor unit arranged at each of said plurality of bay levels, each said conveyor unit being displaceable at right angles to said inlets of respective said ramps, said each conveyor unit transporting the fed container to a selected said ramp and filling said selected ramp with the fed container;

an elevator selectively conveying a container into one of said conveyor units of said plurality of bay levels; and a container feed section feeding the plurality of containers to said elevator.

2. A shipping bay arrangement in accordance with claim 1, further comprising:

a separate buffer section arranged downstream of said elevator in each of said plurality of bay levels, each said buffer section having an outlet, said each level conveyor unit is positioned for taking over a fed container from a respective said buffer section of a respective said bay level.

3. A shipping bay arrangement in accordance with claim 2, wherein:

said ramps are arranged to form a shipping bay;

said level conveyor units are guided in horizontal braces of said shipping bay which are designed as rails, each of said level conveyor units comprising a plurality of rollers, each of said level conveyor units being movably mounted to one of said rails and another one of said rails such that each of said level conveyor units moves in a traveling direction along said rails, whereby said level conveyor units move relative to said rails, said plurality of rollers being parallel to said traveling direction and said rails, said plurality of rollers being arranged between said one of said rails and said another one of said rails, wherein each of said level conveyor units is arranged between one of said rails and another one of said rails, each of level conveyor units bridging a gap between said rails.

4. A shipping bay arrangement in accordance with claim 3, wherein:

said ramps are arranged to form a double bay with a central bay aisle;

said level conveyor units are horizontally displaceable in said central bay aisle of said double bay and can be positioned at said outlets of said buffer sections and at said inlets of opposite said ramps, at least said rails defining said central bay aisle, each of said level conveyor units engaging one of said rails and another one of said rails.

5. A shipping bay arrangement in accordance with claim 1, wherein:
said level conveyor unit has a load pickup means.

6. A shipping bay arrangement in accordance with claim 5, wherein:
said load pickup means includes a plurality of drivable rollers, whose axes extend in a direction of travel of a respective said level conveyor unit and at right angles to said ramps.

7. A shipping bay arrangement in accordance with claim 5, wherein:
said load pickup means is formed by one of a conveyor belt, and a plurality of round or toothed belts.

8. A shipping bay arrangement in accordance with claim 5, wherein:
said load pickup means has a stationary lateral railing at right angles to a direction of travel of said level conveyor unit.

9. A shipping bay arrangement in accordance with claim 5, wherein:
said load pickup means has two lateral railing at right angles to a direction of travel of said level conveyor unit, a distance between said two lateral railings being selectively adjustable to correspond to a width of one of the containers, with at least one of said two railings being adjustable relative to said level conveyor unit.

10. A shipping bay arrangement in accordance with claim 9, wherein:
said ramps have different widths;
said level conveyor unit is positionable at said inlets of said ramps having different widths, said distance between said two railings being selectively adjustable to a respective said width of said ramp to be serviced.

11. A shipping bay arrangement in accordance with claim 1, wherein:
said level conveyor unit includes an electric drive, which is connected to a stationary electrical conductor rail via sliding contacts.

12. A shipping bay arrangement in accordance with claim 11, wherein:
said electric drive has a shaft encoder measuring a distance traveled by said level conveyor unit.

13. A shipping bay arrangement in accordance with claim 1, wherein:
said level conveyor unit includes a sensor recognizing a state of filling of said ramps.

14. A shipping bay arrangement in accordance with claim 1, wherein:
said container feed section includes recognition means for recognizing a fed container and for transmitting data of the container to a central computer, which brings about a fully automatic feeding and sorting operation of the containers into said ramps.

15. A shipping bay arrangement in accordance with claim 1, wherein:
said container feed section is arranged overhead.

16. A shipping bay arrangement in accordance with claim 1, wherein:
said container feed section has a connection section for feeding an adjacent shipping bay.

17. A shipping bay arrangement in accordance with claim 1, wherein:
said plurality of ramps are arranged into a plurality of bay modules, which are located one after another and are in a direction of travel of said level conveyor units.

18. A shipping bay arrangement conveying a plurality of containers, the shipping bay arrangement comprising:
a plurality of ramps receiving and guiding the containers, said plurality of ramps being arranged in a plurality of levels relative to a ground level, each of said levels including a plurality of said ramps arranged in a horizontal direction, said each of said levels being arranged in a vertical direction, each of said plurality of ramps having an inlet and an outlet to define a lowest group of outlets and a highest group of outlets of the shipping bay arrangement, said lowest group of outlets and said highest group of outlets being within a human reach range relative to said ground level, wherein said containers in said ramps are graspable via a human operator;
a plurality of level conveyor units, each of said level conveyor units being arranged at a different one of said plurality of levels of said ramps, each of said plurality of level conveyor units being mounted for movement such that each of said level conveyor units is movable along one of said plurality of levels in a first horizontal direction and in a second horizontal direction, said first horizontal direction being opposite said second horizontal direction, said each level conveyor unit receiving the containers at a receiving end and selectively conveying the containers to said inlets of said ramps in a respective said level;
an elevator arranged at said receiving ends of said plurality of level conveyor units, said elevator selectively transferring the containers to said plurality of level conveyor units; and
a feed section conveying the containers to the elevator.

19. A shipping bay arrangement in accordance with claim 18, further comprising:
a plurality of buffer sections, each of said buffer sections being arranged between said elevator and a different one of said receiving ends of a respective level conveyor unit;
said each buffer section holding a plurality of the containers simultaneously;
said each buffer section individually receiving a container from the elevator and individually discharging a container to said receiving end of said respective level conveyor unit, said ramps being sloped and said ramps including lateral roller strips, wherein separating webs are arranged between adjacent said ramps of one bay level.

* * * * *